No. 861,672. PATENTED JULY 30, 1907.
D. O. PAIGE.
PLANT FOR BEVELING THE EDGES OF SHEET METAL PLATES.
APPLICATION FILED FEB. 24, 1905.

2 SHEETS—SHEET 1.

Witnesses
Walter B. Payne.
Clarence A. Bateman

Inventor
David O. Paige
By Frederick H. Chase
his Attorney

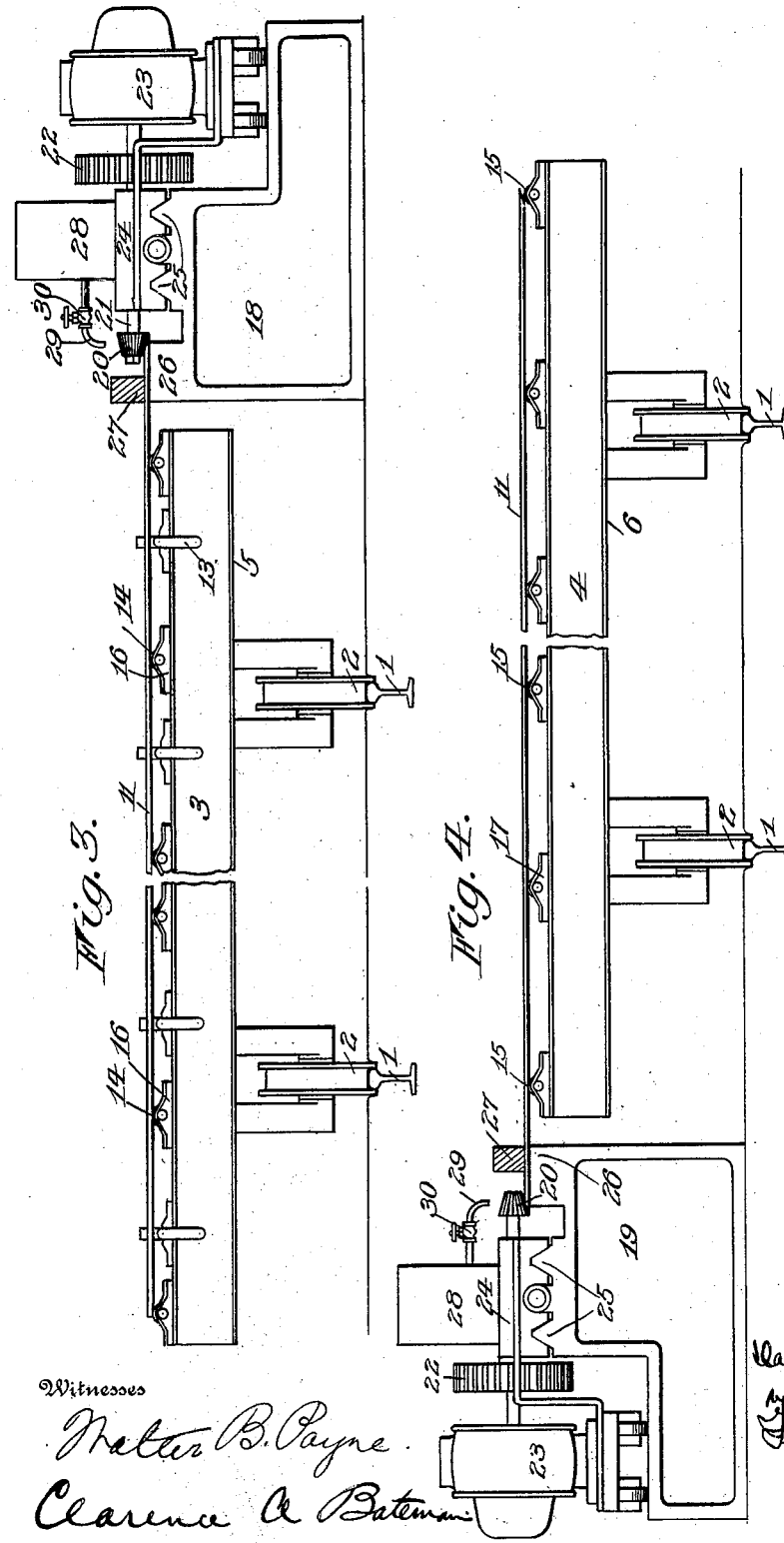

UNITED STATES PATENT OFFICE.

DAVID O. PAIGE, OF DETROIT, MICHIGAN, ASSIGNOR TO THE PFAUDLER COMPANY, OF ROCHESTER, NEW YORK, A CORPORATION OF NEW YORK.

PLANT FOR BEVELING THE EDGES OF SHEET-METAL PLATES.

No. 861,672.  Specification of Letters Patent.  Patented July 30, 1907.

Application filed February 24, 1905. Serial No. 247,122.

*To all whom it may concern:*

Be it known that I, DAVID O. PAIGE, of Detroit, in the county of Wayne and State of Michigan, have invented certain new and useful Improvements in Plants for Beveling the Edges of Sheet-Metal Plates; and I do hereby declare the following to be a full, clear, and exact description of the same, reference being had to the accompanying drawings, forming a part of the specification, and to the reference-numerals marked thereon.

My present invention relates to improvements in apparatus for operating upon plates of sheet metal of considerable size and weight, and the purpose of my invention is to provide a plant for beveling or otherwise removing a strip of material from the opposite surfaces of each plate in a direction transversely of the plate for the purpose of enabling the opposite ends of the plate to be brought together and welded or otherwise secured to form an annular ring of substantially equal thickness at all points, and this purpose I accomplish by the use of apparatus such as that described whereby the plates may be readily placed in operative position to enable one of its transverse edges to be reduced and then reversed, or inverted in order that its opposite transverse edge may be reduced, the operations described being thereby simplified so as to enable the plates to be easily handled during the transferring operations.

To these and other ends the invention consists in certain improvements and combinations of parts all as will be hereinafter more fully described, the novel features being pointed out in the claims at the end of the specification.

Figure 1:
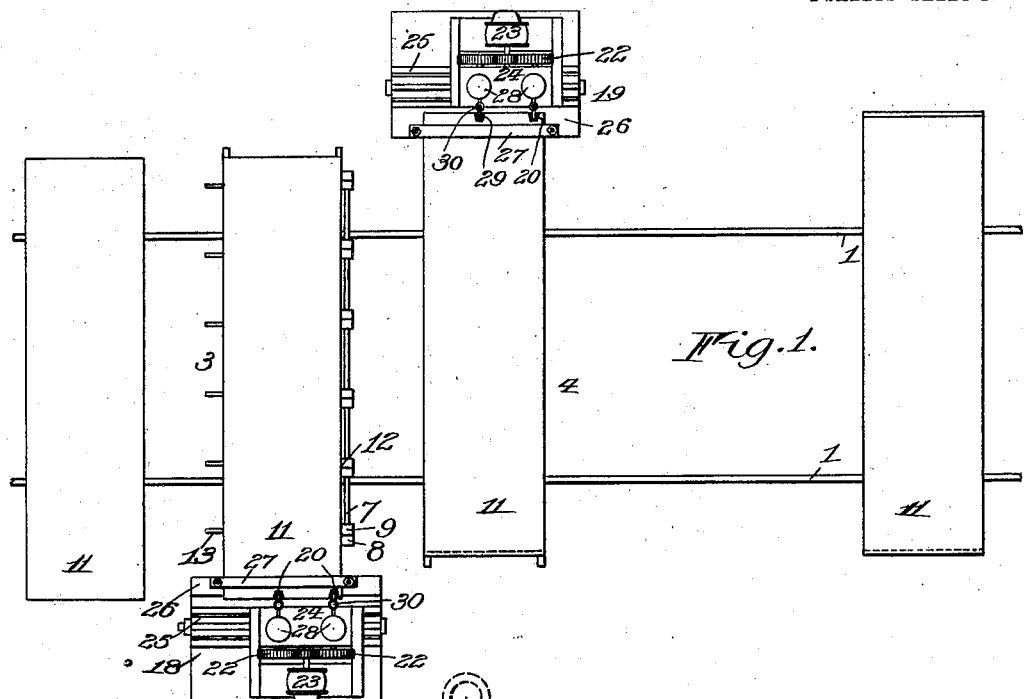
Figure 2:
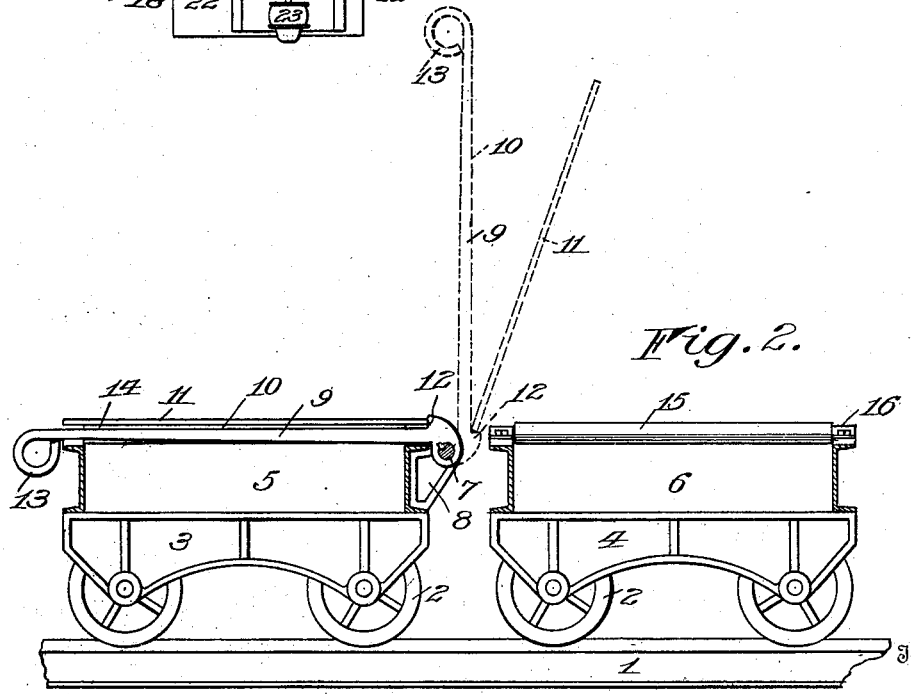

In the drawings: Figure 1 is a plan view of a plant of the kind described constructed in accordance with my invention. Fig. 2 is a transverse section through the portable supports showing a plate in operative position upon one of them in full lines, and showing in dotted lines a transferring device and the plate about to be transferred from one of the supports to the other, and Figs. 3 and 4 are side elevations showing the respective supports and the plates thereon in operative position relatively to their corresponding operating tools.

Similar reference numerals in the several figures indicate similar parts.

My invention is particularly adapted for use in facilitating the operations of reducing or beveling the opposite ends of sheet metal plates in order that they may be brought together and united by welding or other suitable processes to form annular rings or sections, which are to be subsequently flanged and secured together to form tanks or other hollow vessels of considerable size such as those employed in the manufacture of beer and other processes which are carried on on a large scale, the interior of these tanks being usually lined with enamel to prevent contamination of the liquids being operated upon, and the present invention is designed to simplify the operations upon sheet metal plates preparatory to being formed into the annular sections and welded or otherwise united.

In carrying my invention into effect I employ the tracks or ways 1 on which the wheels 2 of the cars 3 and 4 or other portable supports travel, and the bodies 5 and 6 of these cars or supports are elongated in a direction transverse to that of the rails 1. These cars or supports may be made up of angle irons or in any other way which would secure ample strength, the support 5 being provided at one side with a longitudinally extending shaft 7, the latter being mounted to rotate in a series of brackets 8, secured to one side of the support, and on this shaft 7 at suitable intervals are secured a series of arms 9. Each of these arms are preferably keyed to the shaft 7 and are provided on their upper surfaces with seats 10 to receive the sheet metal plates 11, an abutment 12 being provided on each of these arms adjacent to the shaft 7 to form a shoulder to coöperate with one of the longitudinal edges of the plates, and the opposite free ends of these arms are provided with the eyes 13 for the attachment of a hook of a crane, or other hoisting device which is capable of tilting these arms in a manner shown in dotted lines in Fig. 2, it being understood that operation of one of these arms will cause the simultaneous operation of the others by reason of the fact that all of them are rigidly attached to the longitudinal shaft 7. At suitable intervals on each of the portable supports 5 and 6 are provided a series of transversely-extending rollers 14 and 15 respectively which are journaled to rotate in the bearings 16 and 17 of the respective cars or supports, the rollers 14 of the supports 5 being so arranged as to rest at a level above the seats 10 which are formed in the upper faces of the arms 9, and these rollers will therefore support the plates free from the said arms while they are on the support 5.

At one side of the tracks 1 is mounted an operating tool 18 which is arranged to receive one end of the plate, and at the opposite side of the tracks and at a distance beyond the tool 18 is provided a similar tool 19 which is arranged to operate upon the opposite end of the plate after it has been transferred from the support 5 and placed in inverted position on the support 6. An operating tool of any desired form may be employed for the purpose of reducing or beveling the edges of the plates, a milling machine being shown in the present instance which comprises cutters 20, mounted on the arbors 21, the latter in turn being driven by the gears 22 and the motor 23, the arbors 21 of the cutters being mounted to travel with the carriage 24 which is arranged to reciprocate in the ways 25 for the purpose of feeding the tools transversely of the plate. On each of these operating tools opposite to the cutters 20 are provided the work supports 26, the upper surfaces of which are in alinement with the surfaces of the rollers 14 and 15 of the movable supports, and above these work supports are provided suitable clamping devices 27 which are adapted to secure the plate in operative position while it is being operated upon by the cutters 20.

In operating a plant of the kind described a plate is placed upon the support 5 by means of a crane or other suitable means, and as it rests upon the rollers 14 thereon it is adjusted longitudinally until one of its ends is extended over the work support 26 and is in proper position relative to the cutters 20, when the clamp 27 may be locked to secure the plate in operative position, the movable support 5 at this time being directly opposite to the tool 18. With the plate in this position the motor 23 is started, causing the cutters 20 to operate upon the upper surface of the plate adjacent to its transverse edge to bevel or otherwise reduce it uniformly, oil or other liquid being supplied during the reducing operation from the reservoir 28 and the pipe 29, the latter being controlled by the valve 30. When the carriage 24 has been operated on its ways 25 to complete the reducing operation, the clamp 27 is released and the plate is withdrawn from the support 26. The hook or other attaching device of a crane or hoist may now be attached to one of the rings 13 of the arms 9 to cause the latter to be simultaneously tilted into the position shown in Fig. 2, and this operation will cause the plate 11 to rest in the seat 10 of the arms with one of its longitudinal edges in engagement with the shoulders 12 as a rest, and when the arms assume a vertical position the plate will be tilted out of the seats 10 and moving about the shoulders 12 as a pivot, it will fall in an inverted position upon the rollers 15 of the support 6, and by adjusting the plate on the support 6 until the edge which is to be operated upon is extended over the support 26, and is in operative position relative to the cutters 20 of the tool 19, the clamp 27 of the latter may be tightened and the tool operated in a manner similar to that described in connection with the tool 18 in reducing the opposite edge of the plate, and when the operation has been completed the plate may be withdrawn and transferred from the support 6 to any suitable position, or it may be subsequently formed into a ring and the oppositely-beveled edges welded or otherwise secured together.

As the supports 5 and 6 are movable along their tracks, they may be moved into any desired positions to facilitate the positioning of the plates while they are being moved into and out of operative position relatively to the operating tools, and during the operation of transferring the plates from the car or support 5 to the support 6 to enable its opposite edges to be operated upon, these supports may be readily moved into proximity so that when the transferring devices made up of the arms 9 are operated, the relative positions of the supports will be such that the plates will be properly deposited upon the support which is to receive it. By providing a series of arms 9 which are arranged at proper intervals and operate in unison, the plates are tilted bodily without being subjected to a torsional or bending stress, and the supporting rollers which are arranged in series at suitable intervals will cause the plates to lie flat upon the respective supports.

A plant of the kind described renders the operations which are performed on sheet metal plates of considerable dimensions and weight comparatively simple and reduces the amount of labor which would otherwise be necessary in transferring and inverting or reversing and otherwise handling, the plates for the purpose of bringing them in proper position relatively to the operating tools, and as these operations are necessary in order that the thickness of the ends of the plates may be reduced in a direction transversely of the plates and from the opposite or reversed surfaces thereof, the formation of tanks of considerable size such as those described is considerably simplified and cheapened.

Of course operating tools of any desired form may be employed in place of those shown as I do not limit myself to those of any particular kind.

I claim as my invention:

1. In a plant for operating upon plates of sheet material, the combination with relatively offset operating tools, of a pair of work supports movable relatively to each other and into and out of alinement with their respective tools for positioning the opposite ends of the plates alternately in coöperative relation with their respective tools, and devices pivoted at the proximate side of one of the supports and arranged to move toward the other support for transferring the plates between the supports.

2. In a plant for reducing the thickness of the opposite edges of sheet metal plates, the combination with the separate operating tools, of supports movable relatively to each other for alternately positioning the opposite ends of the plates relatively to each tool, and operatively connected arms pivoted to one edge of one of said supports for transferring the plates between the supports.

3. In a plant for beveling the opposite surfaces of a plate adjacent to its opposite edges, the combination with the operating tools, of supports movable relatively toward and from each other and into and out of alinement with their respective tools for positioning the plates relatively to the operating tools, and devices pivoted to the proximate edge of one of the supports and normally resting beneath the plate thereon for transferring the plates from one of the supports and depositing them in inverted position upon the other support.

4. In a plant for removing material from the opposite surfaces of a plate adjacent to its edges, the combination with the operating tools arranged out of alinement for receiving successively the opposite ends of the plate, of separate supports movable relatively to each other and into and out of alinement with the tools for alternately positioning the opposite ends of the plate relatively to the respective operating tools, and swinging arms pivoted to an edge of one of the supports and resting beneath the plate thereon for transferring the plate from one of the supports and depositing it in inverted arrangement upon the other support.

5. In a plant for operating on plates of sheet material, the combination with the operating tools arranged out of alinement for successively receiving the opposite ends of the plate, of portable cars adapted to support the sheets of material and arranged to be moved into coöperative relation with each other and with the tools, and a transferring device pivoted to swing from the proximate edge of one of the cars for lifting each sheet from its respective car and depositing it in inverted arrangement on the other.

6. In a plant for removing material from the opposite surfaces of a plate adjacent to its edges, the combination with the operating tools arranged out of alinement for receiving successively the opposite ends of the plate, of separate supports for positioning the plate relatively to the respective operating tools, and a transferring device carried by one of the supports embodying a series of spaced arms adapted to engage beneath the plate and connected to operate in unison to remove the plate bodily from the respective support.

7. In a plant for operating upon sheet metal plates, the combination with the operating tools, of separate supports for positioning the plate successively relatively to the respective tools, and a transferring device carried by one of the supports embodying a rotatable shaft, a series of arms fixed to the shaft and adapted to engage beneath the plate, and shoulders on the arms to engage one of the lateral edges of the plate to cause a tilting motion thereof as the arms are operated.

8. In a plant for operating upon plates of sheet material, the combination with the operating tools, of relatively movable supports for positioning the plate successively relatively to the respective tools, and a transferring device carried by one of the supports when the latter are moved into proximity embodying a horizontal shaft journaled at one side of the support, a series of arms fixed to the shaft and provided with seats to receive the plate, and shoulders on said arms adjacent to the shaft arranged to coöperate with one of the edges of the plate to cause it to tilt as the arms are operated about the shaft.

9. In a plant for operating on plates of sheet material, the combination with the operating tools, of cars arranged to operate on tracks between the tools and adapted to support the plates in operative position relatively to the tools, a series of rollers on the bed of each car to receive the plates and permit adjustment thereof relatively to the tools, and a transferring device pivoted to an edge of one of the cars having portions extending between the rollers and arranged to engage beneath the plate thereon for transferring the plates between the cars.

10. In a plant for handling plates of sheet material, the combination with an operating tool, of a portable support adapted to receive the plates and mounted to operate on ways extending transversely of the tool, said support having a bed provided with a series of rollers journaled to rotate in a plane arranged transversely to the direction of movement of the support, a work support in fixed relation to the tool and serving as a rest for one end of the plate, and a clamp for securing the plate to the work support and in coöperative relation with the tool.

11. In a plant for operating upon plates of sheet material, the combination with the separate operating tools, of separate supports movable relatively to each other and to the tools for alternately positioning the plates relatively to the respective tools to enable the opposite edges of the plates to be operated upon successively, a series of rollers mounted on each of the supports to support the plates so as to enable them to be moved toward and away from the respective tools, and pivoted arms operating between the rollers on one of the supports for transferring the plates between the supports.

12. In a plant for operating upon opposite edges of plates of sheet material, the combination with the separate operating tools each having a work support, and a clamp for securing the corresponding end of the plate in operative position relatively to the operating tool, of separate supports movable relatively to each other between the tools and into and out of alinement with their respective tools for positioning the plates in relation thereto, a series of rollers forming a bed to receive the plates on each of the supports and journaled to rotate and permit the plates to be moved toward and away from the respective tools, a set of simultaneously operable arms resting between the rollers on one of the supports for transferring the plates between the supports.

DAVID O. PAIGE.

Witnesses:
CLARENCE A. BATEMAN,
G. WILLARD RICH.